US008902260B2

(12) United States Patent
Kuhne

(10) Patent No.: US 8,902,260 B2
(45) Date of Patent: Dec. 2, 2014

(54) SIMPLIFIED CREATION OF CUSTOMIZED MAPS

(75) Inventor: Stefan Kuhne, San Jose, CA (US)

(73) Assignee: Google Inc., Mountain View, CA (US)

(*) Notice: Subject to any disclaimer, the term of this patent is extended or adjusted under 35 U.S.C. 154(b) by 876 days.

(21) Appl. No.: 12/874,048

(22) Filed: Sep. 1, 2010

(65) Prior Publication Data

US 2012/0120104 A1 May 17, 2012

(51) Int. Cl.
*G09G 5/00* (2006.01)
*G09B 29/00* (2006.01)
*G09B 29/10* (2006.01)

(52) U.S. Cl.
CPC ............ *G09B 29/006* (2013.01); *G09B 29/106* (2013.01)
USPC .......................................... 345/661; 701/409

(58) Field of Classification Search
None
See application file for complete search history.

(56) References Cited

U.S. PATENT DOCUMENTS

| | | | | |
|---|---|---|---|---|
| 4,914,605 A * | 4/1990 | Loughmiller et al. | ........ | 345/649 |
| 5,904,727 A * | 5/1999 | Prabhakaran | ................ | 701/454 |
| 7,466,244 B2 * | 12/2008 | Kimchi et al. | ............. | 340/995.1 |
| 8,228,330 B2 * | 7/2012 | Alsbury et al. | ............... | 345/440 |
| 8,274,506 B1 * | 9/2012 | Rees | ................ | 345/419 |
| 8,436,872 B2 * | 5/2013 | Wright et al. | ................. | 345/633 |
| 2004/0230371 A1 * | 11/2004 | Vincent et al. | ................ | 701/200 |
| 2004/0257340 A1 * | 12/2004 | Jawerth | ........................ | 345/157 |
| 2005/0243104 A1 * | 11/2005 | Kinghorn | ...................... | 345/649 |
| 2007/0132767 A1 * | 6/2007 | Wright et al. | ................ | 345/475 |
| 2008/0018745 A1 * | 1/2008 | Iyoda | ...................... | 348/207.99 |
| 2008/0056538 A1 * | 3/2008 | Frank | ............................. | 382/113 |
| 2008/0068380 A1 * | 3/2008 | McAvoy et al. | ............... | 345/428 |
| 2008/0070593 A1 * | 3/2008 | Altman et al. | ................. | 455/457 |
| 2008/0192053 A1 * | 8/2008 | Howell et al. | .................. | 345/427 |
| 2008/0294678 A1 * | 11/2008 | Gorman et al. | ............... | 707/102 |
| 2009/0112816 A1 * | 4/2009 | Marlow | ............................ | 707/3 |
| 2009/0143077 A1 * | 6/2009 | Jamshidi | ..................... | 455/456.1 |
| 2009/0183083 A1 * | 7/2009 | Hedges | .......................... | 715/738 |
| 2010/0023259 A1 * | 1/2010 | Krumm et al. | ................ | 701/208 |
| 2010/0023851 A1 * | 1/2010 | Schormann | ................... | 715/232 |
| 2010/0167256 A1 * | 7/2010 | Blash | ............................ | 434/308 |
| 2010/0214300 A1 * | 8/2010 | Alsbury et al. | ............. | 345/440.2 |
| 2010/0298050 A1 * | 11/2010 | Taraschuk et al. | ............... | 463/31 |
| 2011/0044533 A1 * | 2/2011 | Cobb et al. | ..................... | 382/155 |
| 2011/0270833 A1 * | 11/2011 | von Kaenel et al. | ........... | 707/736 |
| 2012/0030578 A1 * | 2/2012 | Athsani et al. | ................. | 715/738 |
| 2012/0254804 A1 * | 10/2012 | Sheha et al. | .................... | 715/834 |
| 2013/0083017 A1 * | 4/2013 | Fong et al. | .................... | 345/419 |

OTHER PUBLICATIONS flight Regression, URL: http://www.flightregression.com/elevation3d.html, 2008.*
Alberto Concejal, 3D Geovisualization by Ablerto Concejal, URL: http://geovisualization.wordpress.com/tag/kml/.*
Orland Hoeber, "KML & Google Earth Tutorial", URL: http://web.archive.org/web/20090702093431/http://www.cs.mun.ca/~hoeber/teaching/cs4767/notes/02.1-kml.*

* cited by examiner

*Primary Examiner* — David H Chu
(74) *Attorney, Agent, or Firm* — Dority & Manning, P.A.

(57) ABSTRACT

Embodiments of the present invention relate to providing a method for creating customized labeled maps that include displaying a map using a presentation device based on a selectable elevation value, where the map contains geocoded information and the user selects at least one position on the displayed map. The method continues by automatically creating and displaying at least one label located in proximity to the selected position, where at least one label is based on reverse geocoded information associated with the selected position.

22 Claims, 15 Drawing Sheets

SIMPLIFIED CREATION OF CUSTOMIZED MAPS

BACKGROUND

1. Field

Embodiments of the present invention relate to generating and customizing maps.

2. Background

A geographic information system (GIS) is used to store, retrieve, and manipulate data that has been stored and indexed according to geographic coordinates. Typical geographic information systems support the display of information associated with specific geographic coordinates where such information is categorized into various layers representing differing levels of detail. Such information can represent such detail as specific addresses at a low layer level and at higher levels data such as the name of the neighborhood, the associated city, county, state, and country.

A user of such geographic information may desire to create a customized map showing a particular feature or highlighting selective information associated with a select area. For example, a television news team may wish to show a map of an area that contains a river that is about to flood and indicate to the viewers the names and locations of the particular towns that are expected to be impacted by the expected flooding. Currently, to create such a map involves a fair amount of time while the user identifies the desired area to be mapped, the desired level of layer of information in a GIS database that is desired to be shown, and then create the desired placemarks and associated labels to convey the desired information to the target audience. While GIS systems can store vast amounts of data, quickly creating customized content for a map is a time consuming task.

BRIEF SUMMARY

Therefore, what are needed are systems and methods that allow for efficient and timely production of customized maps showing selective information.

In an embodiment of the present invention, there is provided a system for creating customized labeled maps that includes a presentation device, a mapping system, and a clickmap system. The mapping system is configured to access map data and use the map data to display a map using the presentation device based on a selectable elevation value. The clickmap system is configured to automatically create and display at least one label located in proximity to a user selected position on the map. Further, the map data includes geocoded information, and at least one label is based on reverse geocoded information associated with the user identified map position.

In another embodiment of the present invention, there is provided a method for creating customized labeled maps, including displaying a map using a presentation device based on a selectable elevation value, where the map contains geocoded information and the user selects at least one position on the displayed map. The method continues by automatically creating and displaying at least one label located in proximity to the selected position, where at least one label is based on reverse geocoded information associated with the selected position.

In a further embodiment of the present invention, there is provided a system for creating customized labeled maps that includes means for displaying a map on a presentation device based on a selectable elevation value, where the map contains geocoded information. The system also includes means for selecting one of more positions on the displayed map and means for automatically creating and displaying at least one label located in proximity to the selected position, where at least one label is based on reverse geocoded information associated with the selected position.

Further embodiments and features, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the information contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and to use the invention.

Figure 1:
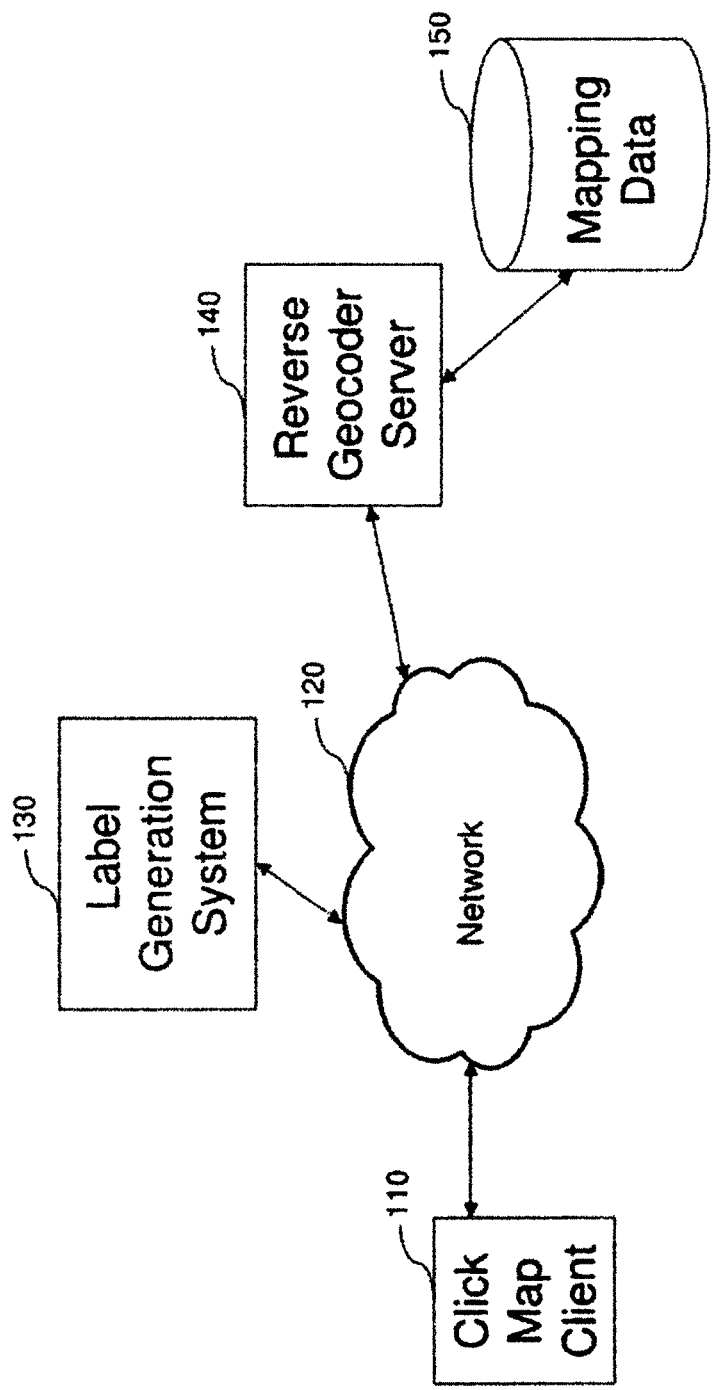
FIG. 1 illustrates an exemplary client/server network environment with a client map client in communication with a reverse geocoder server over a communication network, according to an embodiment of the present invention.

The features of various embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The embodiments described herein are referred in the specification as "one embodiment," "an embodiment," "an example embodiment," etc. These references indicate that the embodiment(s) described can include a particular feature, structure, or characteristic, but every embodiment does not necessarily include every described feature, structure, or characteristic. Further, when a particular feature, structure, or characteristic is described in connection with an embodiment, it is understood that it is within the knowledge of one skilled in the art to affect such feature, structure, or characteristic in connection with other embodiments whether or not explicitly described.

Embodiments of the present invention relate to the creation of customizable clickmaps based on reverse geocoded data Example System Embodiments FIG. 1 is a diagram illustrating system 100 according to an embodiment of the present invention. System 100 includes a clickmap client 110, a network 120, a label generation system 130, one or more reverse geocoder server(s) 140, and a store of mapping data 150.

Clickmap client 110 communicates with label generation system 130 and one or more reverse geocoder servers 140, for example, across one or more networks 120, such as the Internet or a local area network. Server(s) 140 may serve mapping data including geographic information, e.g., geographic layer data, to clickmap client 110 and/or label generation system 130 based on mapping data 150.

Clickmap client 110 presents a visual representation of a map to a user. In an embodiment the user can enter a desired address to be presented in a map format. Once the mapped location is presented using clickmap client 110, the user can customize the presented map with one or more labels identifying selective locations on the map. Once a specific position is located on the map, clickmap client 110 communicates with label generation system 130 to retrieve geocoded data from reverse geocoder server 140 that is associated with the selected location. Label generation system 130 then generates a label that includes the associated geocoded information for display by clickmap client 110. The user, through clickmap client 110, has the option of modifying the position, style, text, and other attributes of the label as will be further described below.

Clickmap client 110 can exist on a device that includes at least one processor, at least one memory, and at least one network interface. For example, clickmap client 110 can be implemented on a personal computer, handheld computer, personal digital assistant, a mobile communication device, a game console, digital entertainment system, set-top box, and the like.

Server 140 can include a web server such as the Google Web Server from Google Inc., Apache Web Server from the Apache foundation, Internet Information Services from Microsoft, and the like. Server 140 can provide access to web content stored locally on server 140 or coupled storage devices (not shown). Server 140 typically includes at least one server computer connected to a network. Example server computers include but are not limited to, a computer, workstation, distributed computing system, computer cluster, embedded system, stand-alone electronic device, networked device, mobile device (e.g. mobile phone or mobile computing device), rack server, set-top box, or other type of computer system having at least one processor, memory, and network interface.

Network 120 includes one or more networks, such as the Internet. In some examples, network 120 can include one or more wide area networks (WAN) or local area networks (LAN). Network 120 can include one or more network technologies such as Ethernet, Fast Ethernet, Gigabit Ethernet, a variant of IEEE 802.11 such as WIFI, and the like.

Figure 2:
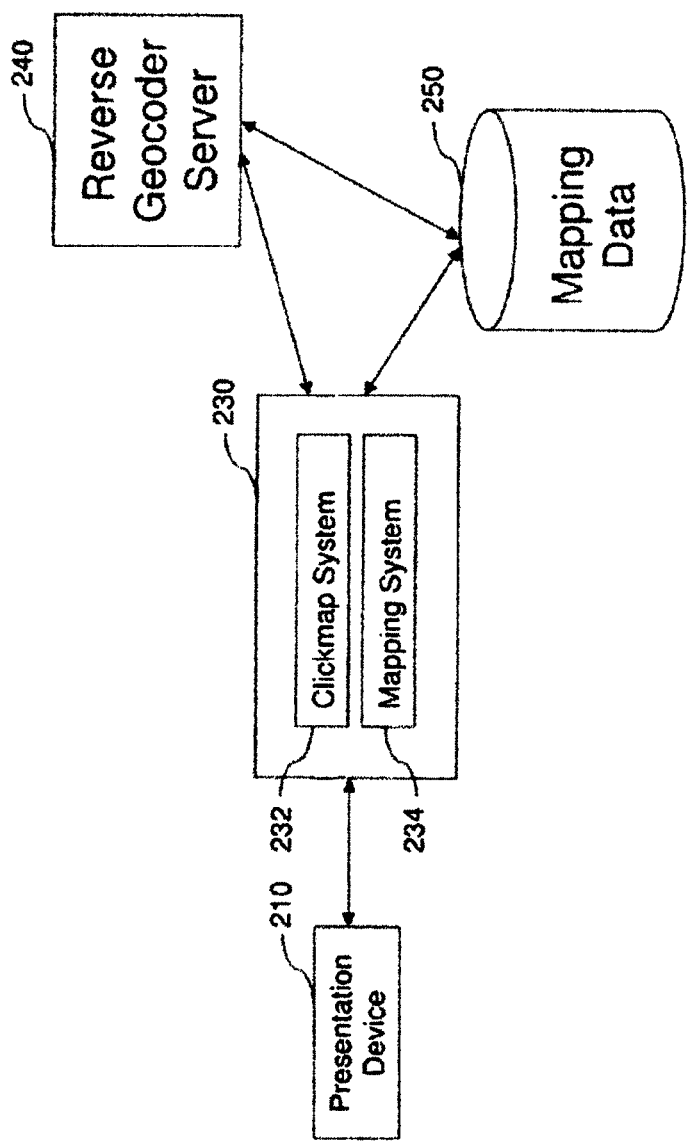
FIG. 2 illustrates an exemplary presentation device connected to a placemark system and a mapping data repository, according to an embodiment of the present invention.

FIG. 2 is a diagram illustrating system 200 according to an embodiment of the present invention. System 200 includes a presentation device 210, a label generation system 230, a reverse geocoder server 240, and a store of mapping data 250. Label generation system 230 includes a mapping system 234 and a clickmap system 232.

Presentation device 210 presents a user with map images produced by mapping system 234 based on mapping data 250. The map images can be any type of image including satellite based, line based, and terrain or image based. As in system 100, the user can customize any given map with the generation of labels based on reversed geocoded data through the use of clickmap system 232. An example of such a customized clickmap can be seen in FIG. 3, according to an embodiment of the present invention.

Figure 3:
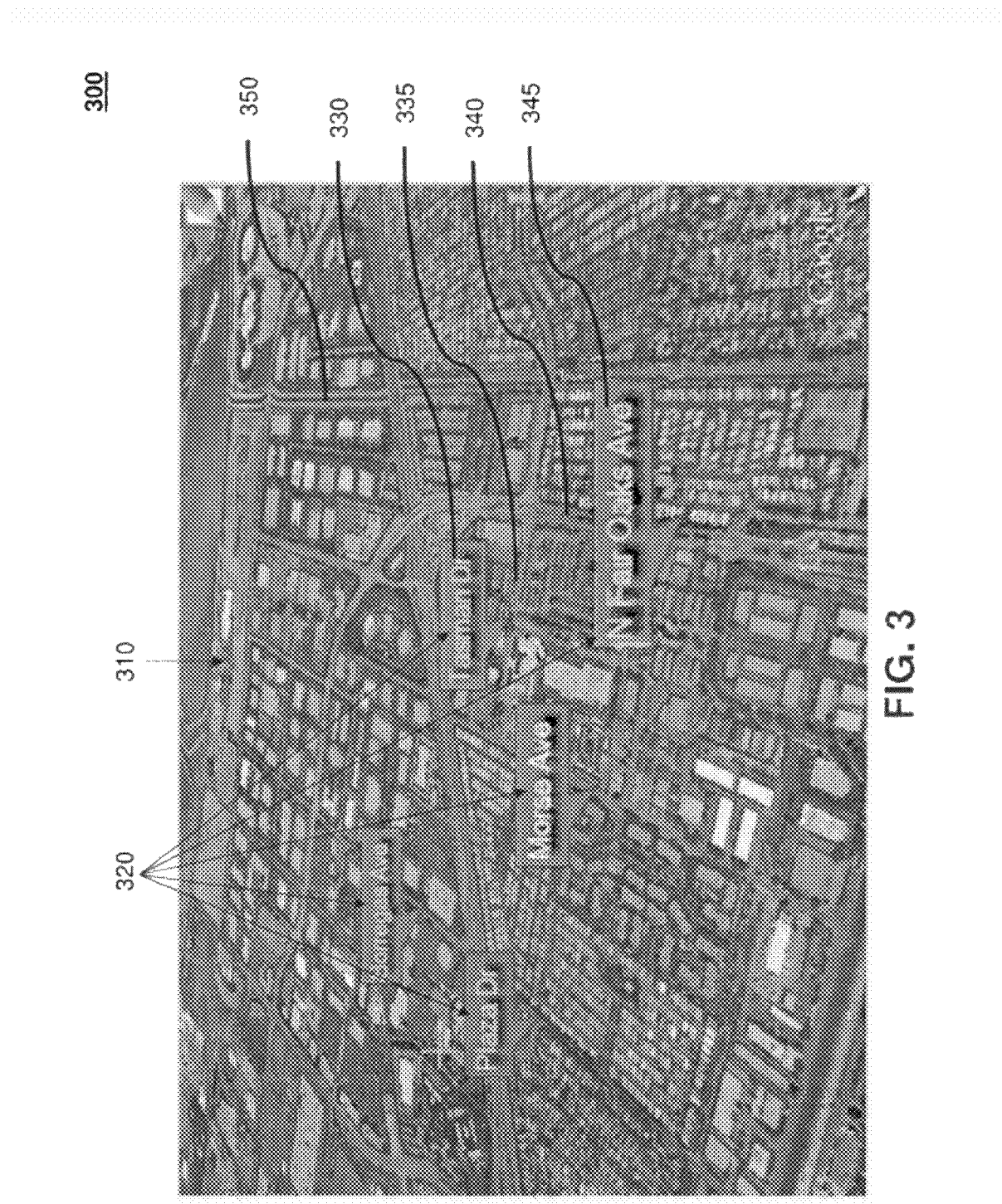
FIG. 3 illustrates an exemplary customized clickmap, according to an embodiment of the present invention.

FIG. 3 illustrates clickmap 300 showing an aerial terrain view of a map 310 populated with five different customized labels 320. By selecting a point on the map, for example by inputting an address, or clicking on a particular portion of the map, label generation system 230 captures the indicated position on the map and communicates with reverse geocoder server 240 to retrieve geocoded data associated with the selected position. In clickmap 300, by selecting N. Fair Oaks Ave. 340, clickmap system 232 automatically generates label 345 that includes the geocoded data, in this example, the street name, and displays the results. In the same manner, Tasman Dr. 335 is selected with label 330 being generated, pointing to Tasman Dr. In addition, notice that not all of the street names in clickmap 300 are displayed with a label, for example road 350 has no label, and thus was not a selective piece of information the user desired to have labeled.

Figure 4:
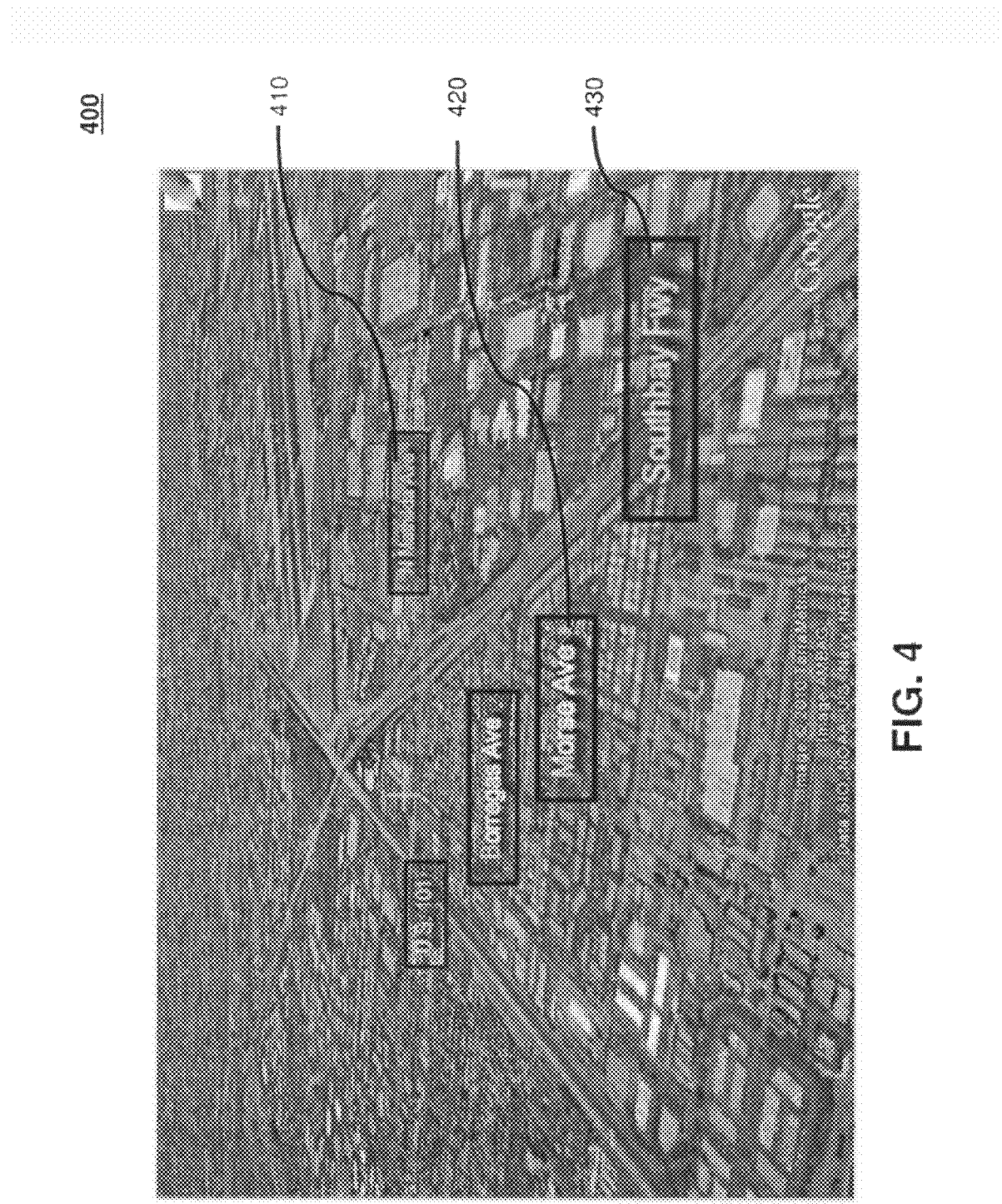
FIG. 4 illustrates a customized clickmap, according to an embodiment of the present invention.

FIG. 4, according to an embodiment of the present invention, illustrates clickmap 400 showing a different style of labels 410, 420, and 430 compared to the labels in clickmap 300.

In an embodiment the user can specify the target level of the information, e.g., street name versus city names. In an embodiment the user can allow clickmap system 232 to determine the most appropriate level of geographic data to display based on the view height of the map. Clickmap system 232 selects a higher level of data the further from the ground the view of the map encompasses. In another embodiment, clickmap system 232 determines the most appropriate level of geographic data to display based on the visibility of the underlying feature. For example, the entire city of San Jose may be able to fit onto the screen whereas the state of California is too big to entirely fit onto the screen. In this example, clickmap system 232 would pick the city of San Jose as the geo coded screen result. In another embodiment the choice of which area to display is based upon data availability where that area with available data would be displayed versus another area where data is not available.

Customizing System Option Embodiments

Location

In an embodiment, the location of a label is based on a user entered address, or on a location selected by the user on a displayed map.

Label Size and Position

In an embodiment, the user can modify the size of the text, or image, associated with a label. Resizing can be accomplished proportionally, as well as non-proportionally. In addition, each element, e.g., text and graphics, can be adjusted independently.

Label Style

A customized label style can be selected by the users such that the user can define a label to consist of test only, artwork only, e.g., an image, or a combination of text and artwork.

The label can be displayed in a variety of ways, including as a fixed image overlay where the label is overlaid on top of, or relative to the ground, or as a placemark where the label always stands up vertically relative to the ground and hence faces the camera at all times. In addition, the label can consist of an animation sequence, three dimensional text, a billboard, or any other type of representation.

Figure 5:
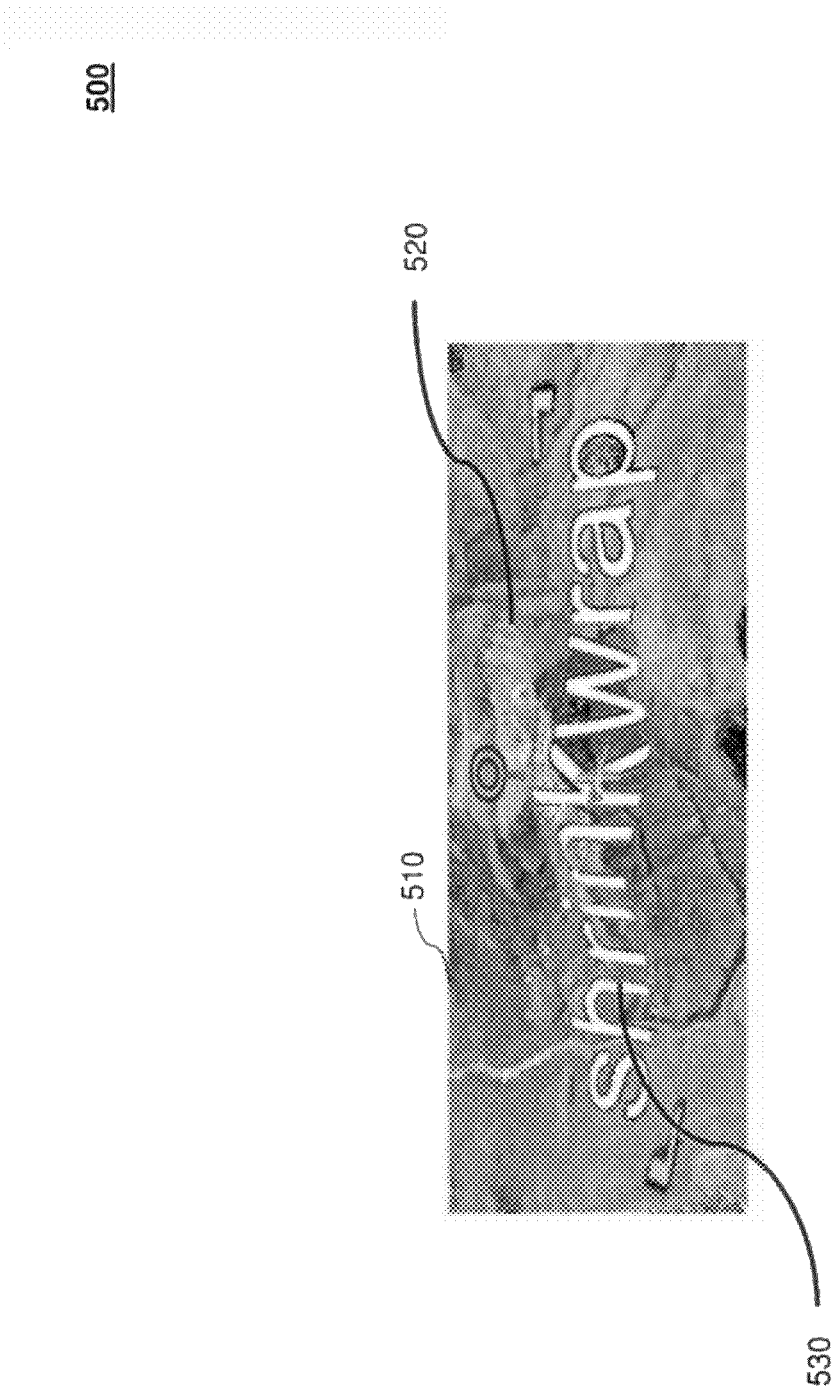
FIGS. 5 and 6 illustrate customizable labels, according to embodiments of the present invention.

An elevation level can also be assigned to a label where the label appears to be at a certain elevation above the ground. The label can also be clamped to the ground, following the contours of the ground. For an example of this, please refer to FIG. 5 that illustrates a clamped to ground label, according to an embodiment of the present invention. FIG. 5 illustrates clickmap 500 that includes map 510 with label 530 that is contoured to the terrain 520 of map 510. In other words, the body of the label matches the contour of the three-dimensional terrain that can make the label appear when rendered for display as if it is shrinkwrapped onto the terrain surface.

Figure 6:
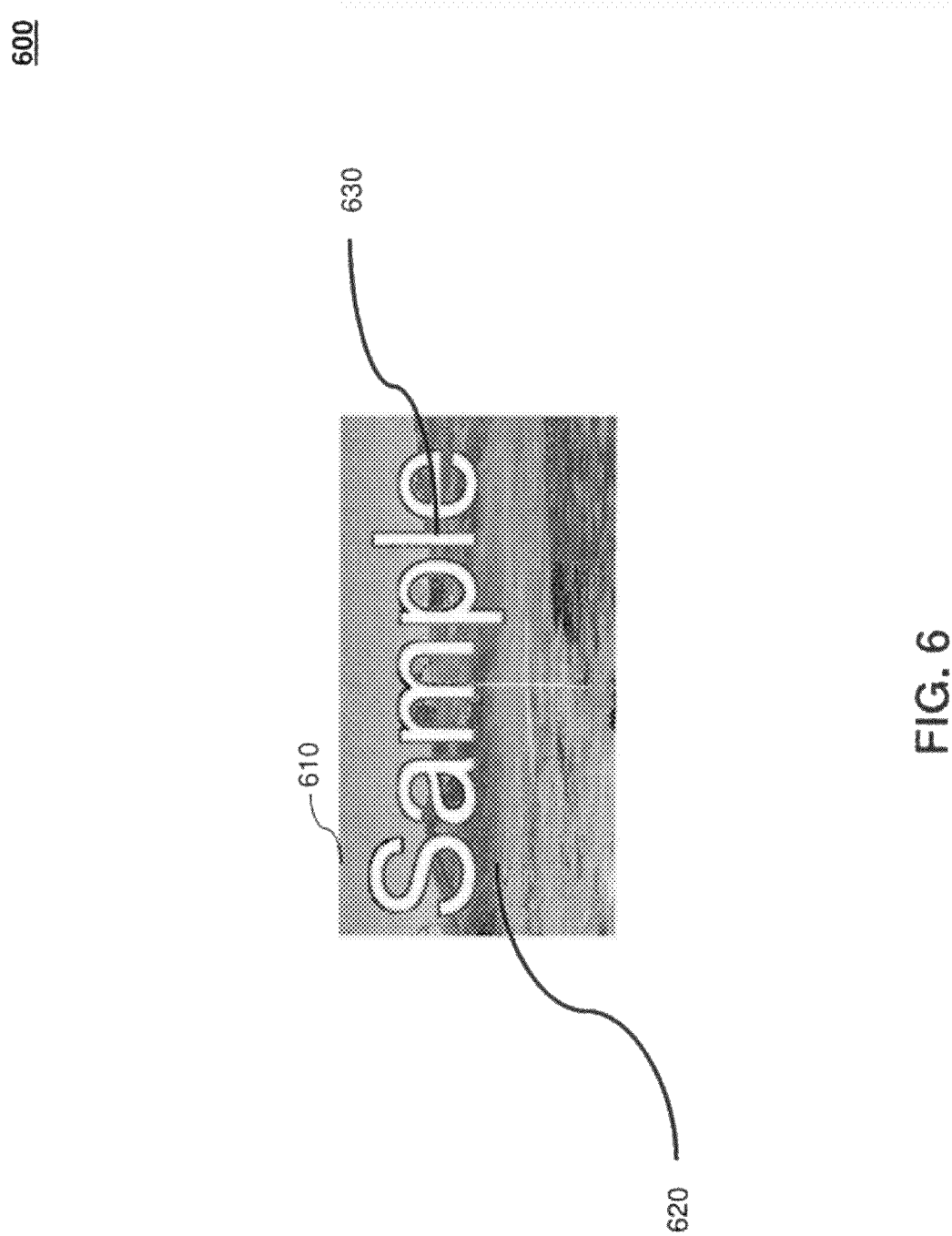

The elevation of a label can be automatically determined by the system or an absolute value can be selected by the user. FIG. 6 illustrates clickmap 600 that includes map 610 with label 630 that is placed at a certain elevation above the ground map 620. Label 630 is shown at approximately 800 meters above the ground. However, the user can modify the elevation height to any desired value.

Text

The visual aspects of the text of the label are modifiable and include font choices, text effects, e.g., shadow, outline, font and shadow color, and various other attributes, e.g., line spacing, text/image interaction for special styling.

Image

Images can also be used in a label by uploading an image file to clickmap system 232.

Visibility

The user has the option of specifying when the label is visible based on the elevation level where there is a specifiable range of elevations in which a particular label is visible.

Balloon

The balloon feature allows a user to specify that a balloon pop up appears when a placemark is selected. If a placemark is associated with a balloon then when selected, the balloon will be shown that contains the label's string.

View

A view, e.g., camera angle, can be associated with a label.

Basic Style

A user may create a style that associates the various visual attributes associated with a label to a defined particular style. Once defined a style can be applied to any label.

Timeline

When a placemark is selected on a particular map and reverse geographic code information is added to the corresponding label, that placemark and associated map can be added to a timeline. By adding multiple placemarks to a timeline the user can create a sequence of displayable actions presenting the various placemarks, labels, and maps in a time linear fashion.

Example User Interface

Figure 7A:
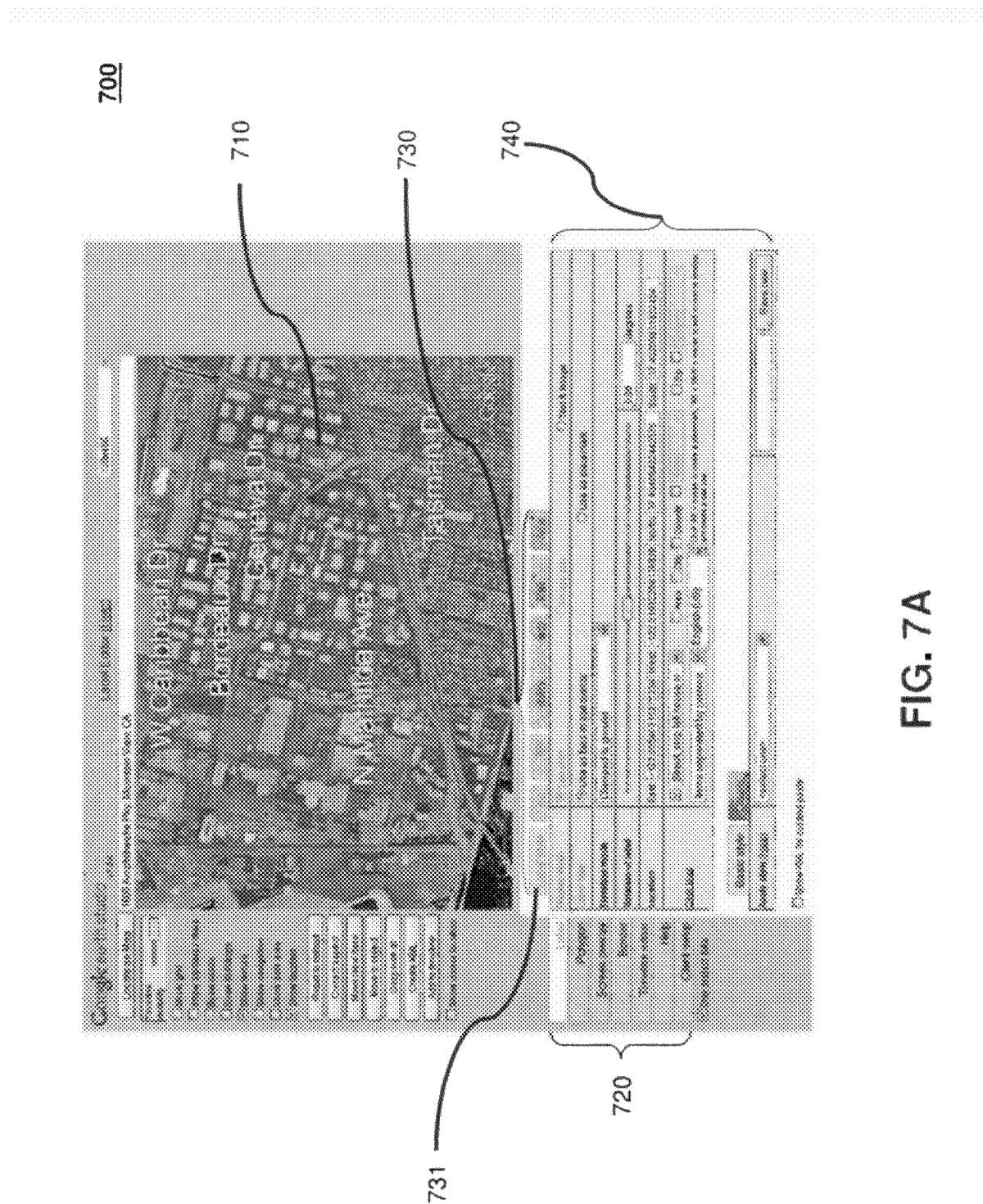
FIGS. 7A-7G illustrate a customized clickmap including a graphical user interface, according to an embodiment of the present invention.

FIG. 7A shows an exemplary user interface 700 for enabling the simplified creation of customized maps, according to an embodiment of the present invention. User interface 700 allows a user to efficiently and effectively create a customized clickmap 710 by utilizing option tabs 720, option sub-tabs 730, and information window 740.

Such customized map visualizations include region outlines, place-marks, and polygons which are dynamically adaptable to user presentation needs (e.g. showing real-time locations of events). Map visualizations can include customized colors, sizes, fonts etc. Customized maps may be generated and displayed within user interface 700 that include an area of interest using label generation system 230. As an example, not intended to limit the invention, user interface 700 may be a user interface of the GOOGLE EARTH STUDIO application by Google Inc. of Mountain View, Calif.

User interface 700 enables a user to interact with label generation system 230. As an example, a user can view user interface 700 on presentation device 210 and interact with user interface 700 via a mouse, digital pen driven input or even via a touch screen implemented on presentation device 210.

Option tabs 720 further include the ability to customize clickmap 710 through the selection of other tabs allowing for customization or assistance relating to clickmap 710. Such tabs can allow for customization such as the attributes of the clickmap labels (shown as information window 740), polygons, screen overlays, borders, and timeline editors. User interface 700 also includes a help section and the ability to manage clickmap client 110 through a client setup tab.

Option sub-tabs 730 allow further customization of attributes associated with a particular option tab 720. FIG. 7, user interface 700 illustrates option sub-tabs 730 associated with the label option in the group of option tabs 720. In this example, option sub-tabs 730 include the ability to select and customize the label style (shown in information window 740), the associated text, image, visibility, balloon, and view.

As shown in information window 740, the label style option sub-tab 731 includes the ability to select the display mode (text only, image only, or text and image), the label type (a fixed image overlay or a placemark), the elevation mode (here shown as being clamped to the ground), the rotation of the label (here shown at zero degrees and controlled using either a slider control or entered as a specific number of degrees), the location of the area shown in clickmap 710 (here the edges are indicated by latitude and longitude), and the level of detail to be shown by selections associated with the clickmap (here showing the selection of street names). Further, information window 740 indicates the ability to apply a predefined template to clickmap 710 by selecting applying a defined style.

Figure 7B:
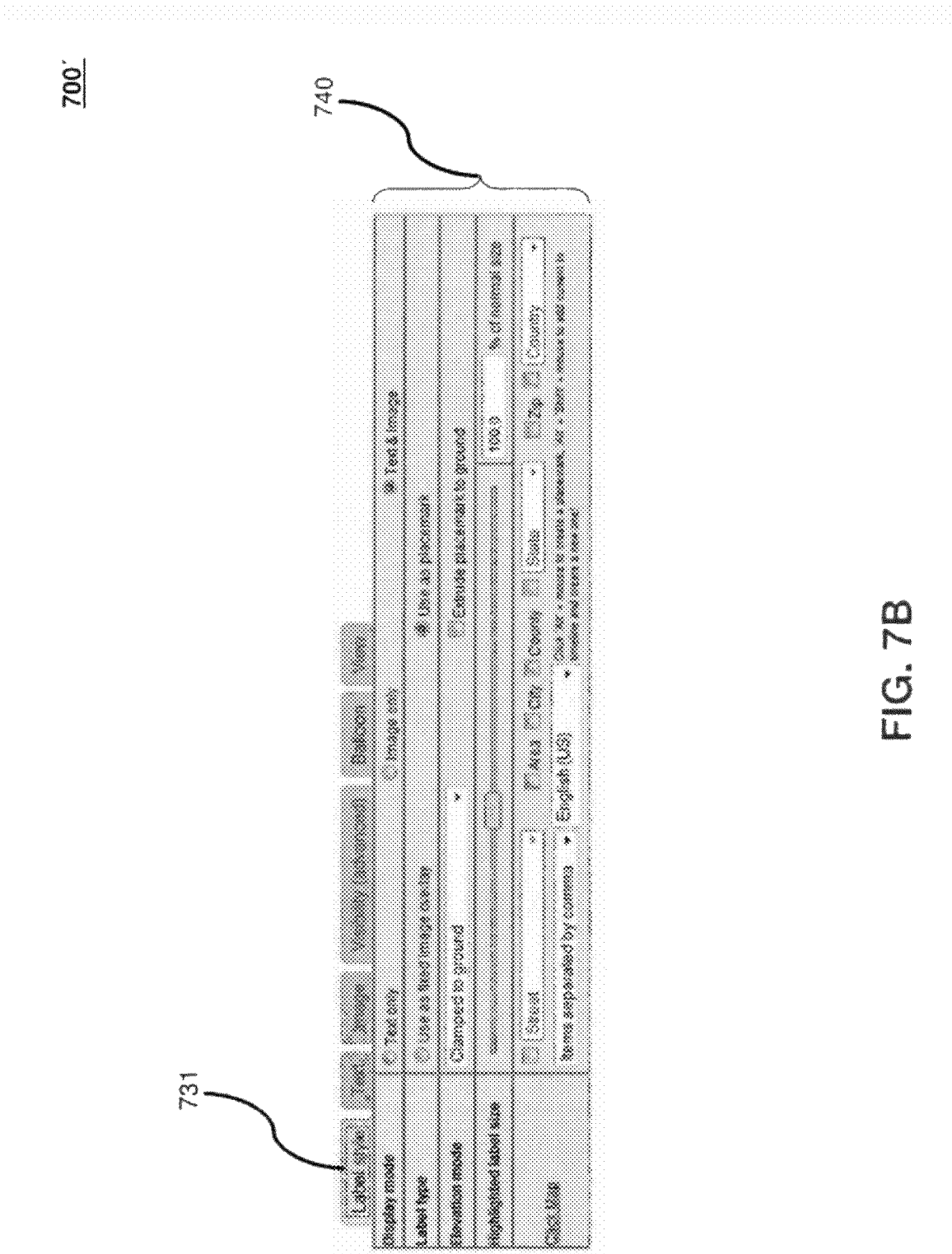

FIG. 7B shows an exemplary user interface 700' for enabling the simplified creation of customized maps, according to an embodiment of the present invention. User interface 700' allows a user to efficiently and effectively create a customized clickmap 710 (not shown) by utilizing label style option sub-tab 731 and the associated information window 741.

As shown in information window 741, label style option sub-tab 731 includes the ability to select the display mode (text only, image only, or text and image), the label type (a fixed image overlay or a placemark), the elevation mode (here shown as being clamped to the ground) with the option of extruding the placemark to the ground, the ability to highlight the label size (here shown at 100.0% of normal size and controlled using either a slider control or entered as a specific percentage), and the level of detail to be shown by selections associated with the clickmap (here showing the ability to select by street, area, city, county, state, zip code, and country).

Figure 7C:
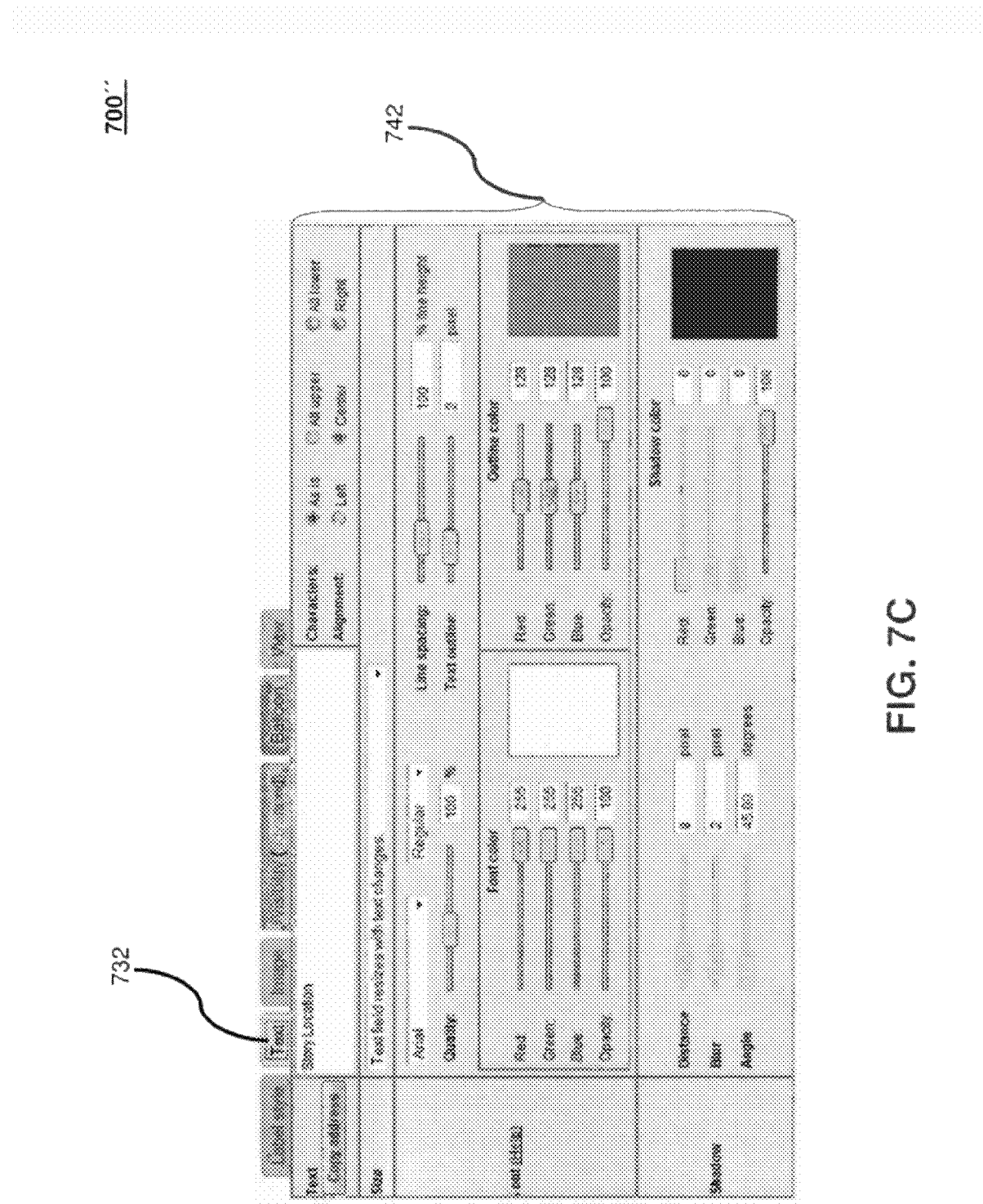

FIG. 7C shows an exemplary user interface 700" for enabling the simplified creation of customized maps, according to an embodiment of the present invention. User interface 700" allows a user to efficiently and effectively create a customized clickmap 710 (not shown) by utilizing text option sub-tab 732 and the associated information window 742.

As shown in information window 742, text option sub-tab 732 includes the ability to enter the text associated with a particular label in addition to its case and alignment (text box). The size selection allows the user to select whether or not the text field resizes when the text changes. Further control of the font is provided where the user can select the font type and style, line spacing, whether the text is to be outlined and by how much, as well as detail control of the font and outline colors by control of the associated levels of red, green, blue, and opacity (here shown at various levels controlled using either a slider control or entered as a specific numeric value). In a similar manner, the amount of shadow the text casts in the label is controlled as a function of distance, blur, angle, and color components (here shown at various levels controlled using either a slider control or entered as a specific numeric value).

Figure 7D:
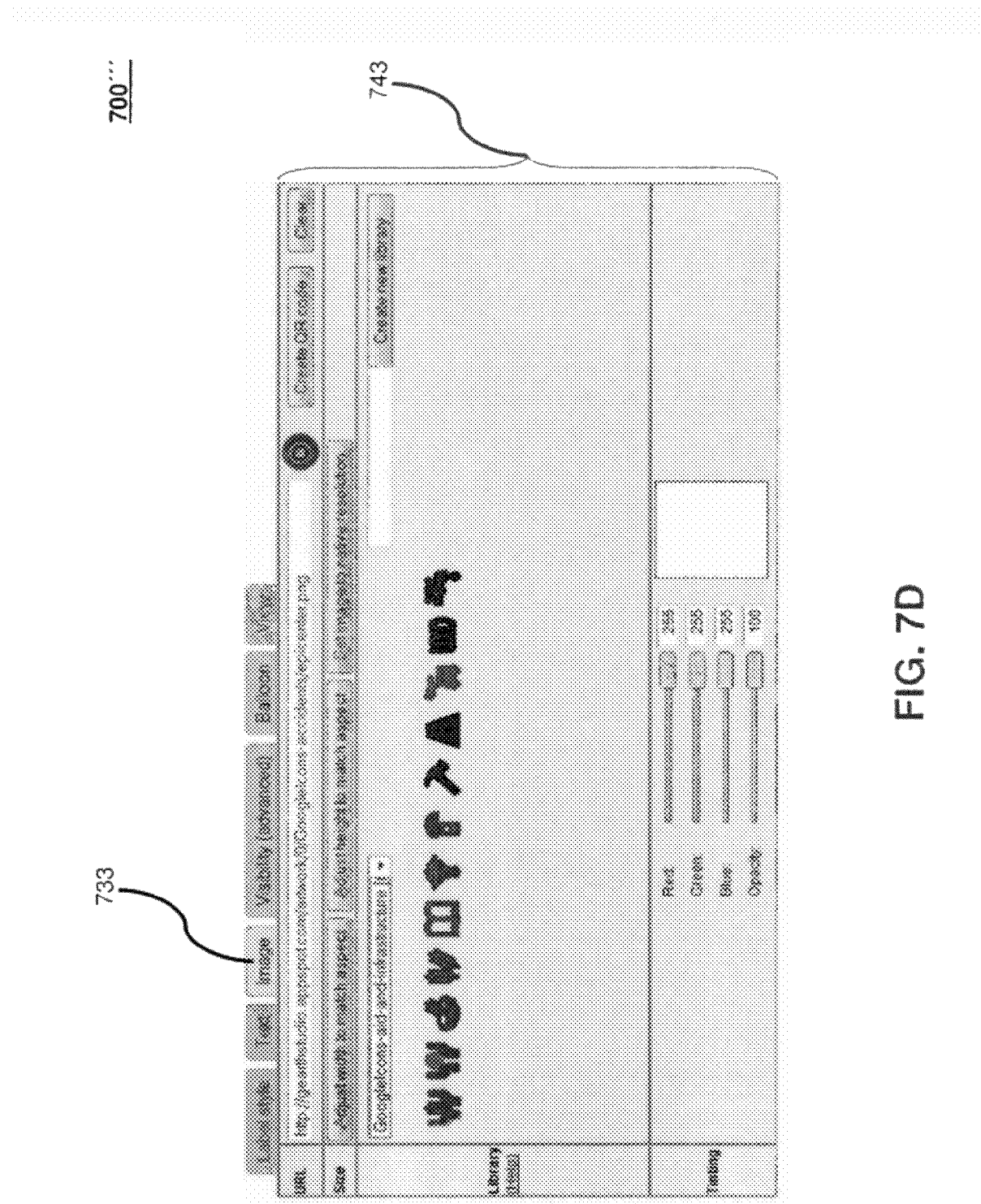

FIG. 7D shows an exemplary user interface 700''' for enabling the simplified creation of customized maps, according to an embodiment of the present invention. User interface 700''' allows a user to efficiently and effectively create a customized clickmap 710 (not shown) by utilizing image option sub-tab 733 and the associated information window 743.

As shown in information window 743, image option sub-tab 733 includes the ability to specify a URL address where a desired image is located and the ability to control the size of the image, e.g., by adjusting the width to match the aspect ratio of the label, by adjusting the height to match the aspect ratio of the label, and to set the image to a native resolution. Also shown is the ability to create a library of images and the ability to create a new library of images. The tinting of the image is controlled by sliders or the direct entry of a numeric value controlling the red, green, blue, and opacity levels of the image.

Figure 7E:
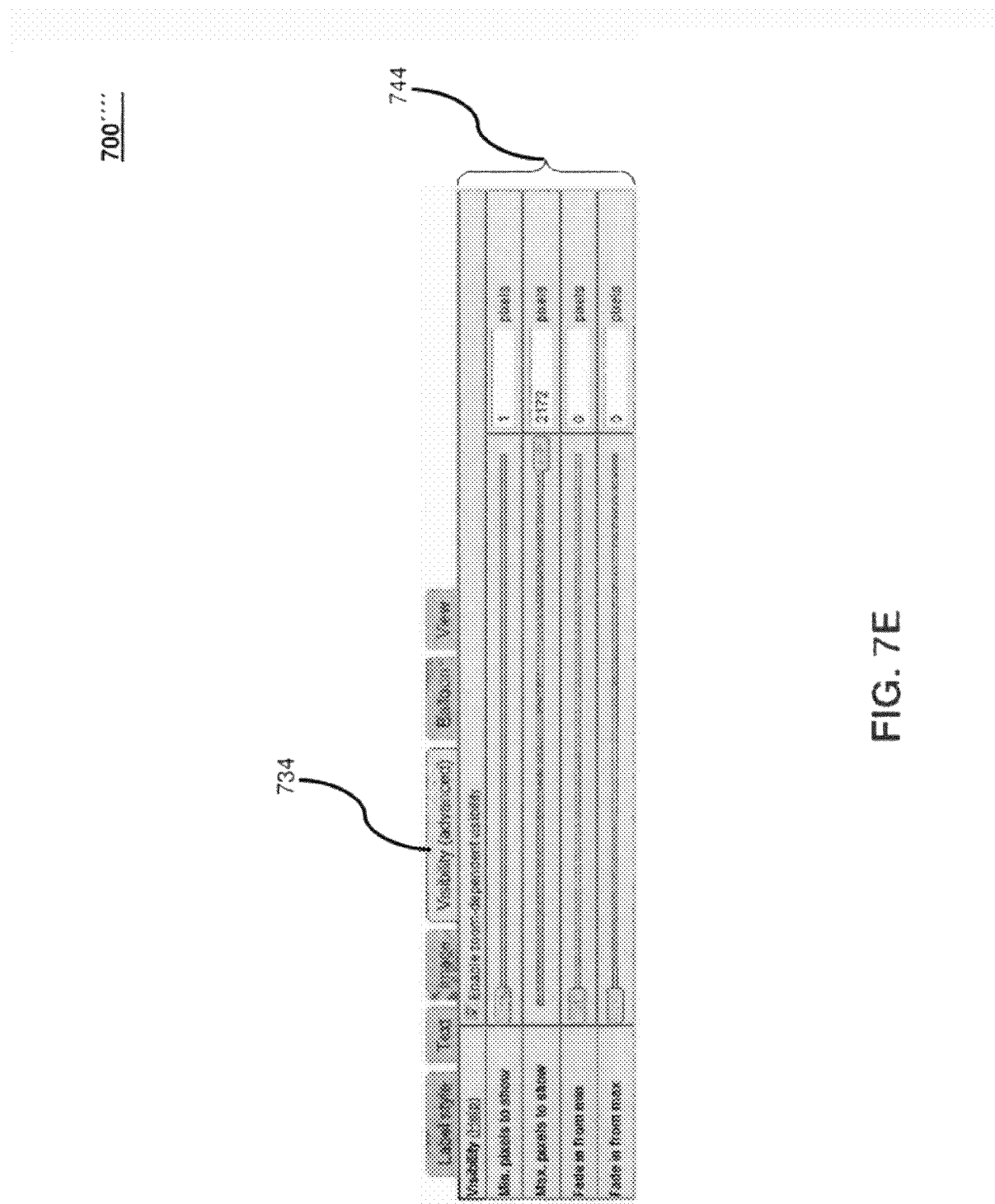

FIG. 7E shows an exemplary user interface 700'''' for enabling the simplified creation of customized maps, according to an embodiment of the present invention. User interface 700'''' allows a user to efficiently and effectively create a customized clickmap 710 (not shown) by utilizing visibility option sub-tab 734 and the associated information window 744.

As shown in information window 744, visibility option sub-tab 734 includes the ability to enable zoom-dependent visibility as previously discussed as well as a minimum and maximum number of pixels to show, controlled by slider or a directly entered numeric value. The amount of fade-in and fade-out, measured in pixels, can also be specified.

Figure 7F:
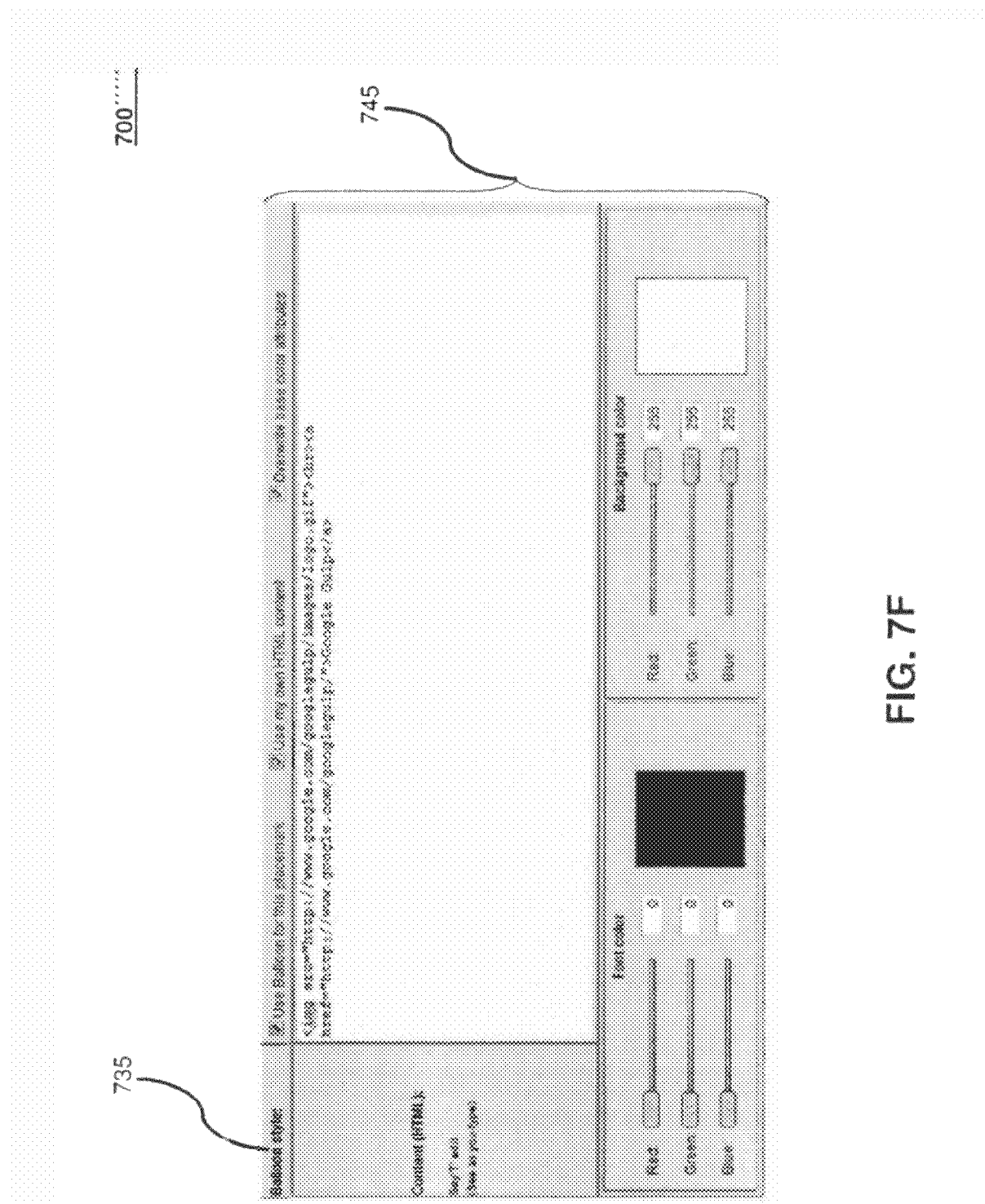

FIG. 7F shows an exemplary user interface 700''''' for enabling the simplified creation of customized maps, according to an embodiment of the present invention. User interface 700''''' allows a user to efficiently and effectively create a customized clickmap 710 (not shown) by utilizing balloon option sub-tab 735 and the associated information window 745.

As shown in information window 745, balloon option sub-tab 735 includes the ability to specify the inclusion of a balloon associated with a label. The balloon has various styles, e.g., where the balloon is used as the placemark, where a user's own HTML content can be substituted in lieu of that supplied by the reverse geocoder server, and whether to overwrite any base color attributes. The content of the balloon is entered as HTML code and the font color and background color are also controllable by the use of sliders or direct numerical entry of the associated red, green, and blue levels, or any other type of color control, e.g., YUV color space.

Figure 7G:
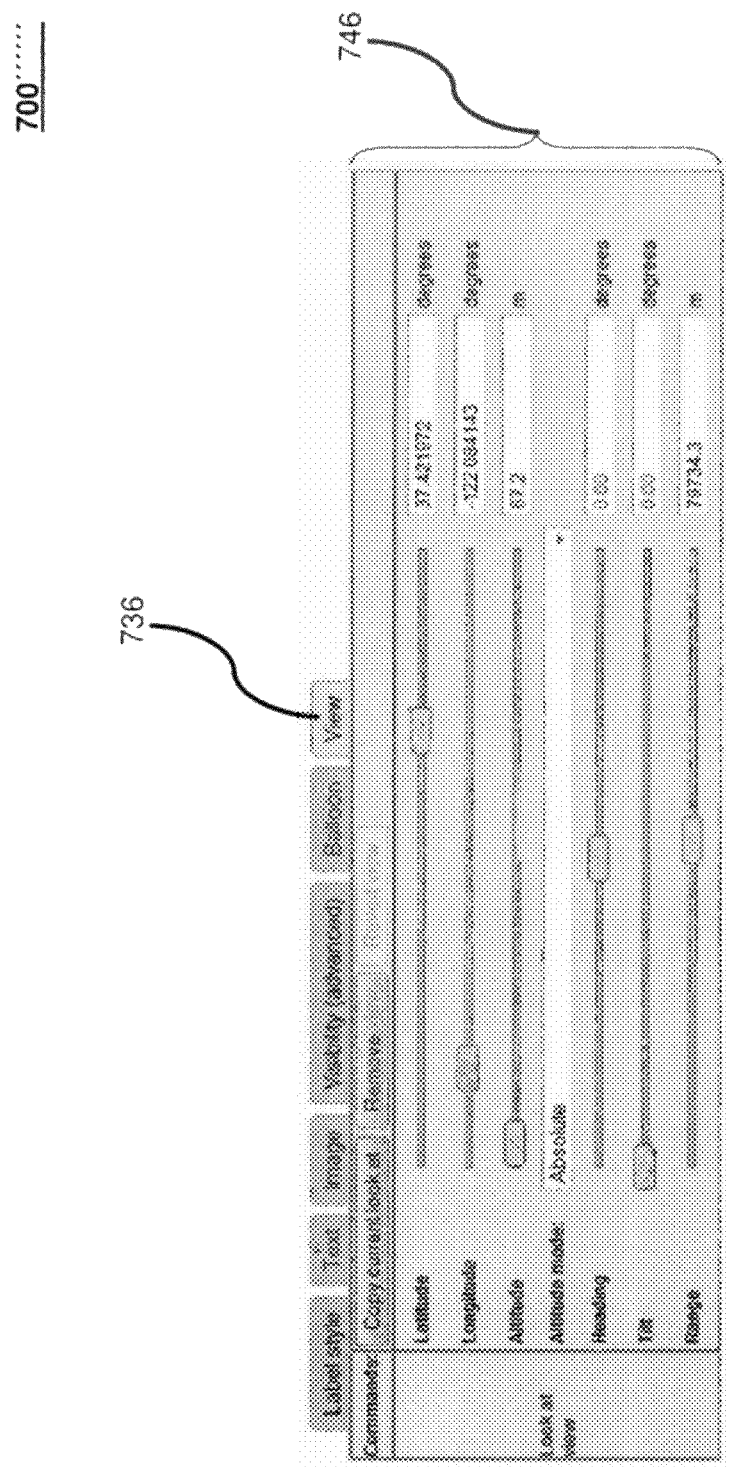

FIG. 7G shows an exemplary user interface 700'''''' for enabling the simplified creation of customized maps, according to an embodiment of the present invention. User interface 700'''''' allows a user to efficiently and effectively create a customized clickmap 710 (not shown) by utilizing view option sub-tab 736 and the associated information window 746.

As shown in information window 746, view option sub-tab 736 includes the ability to copy, remove, and revert a view associated with a particular label. Further the view can be controlled as a function of latitude and longitude, specified by slider or direct numeric entry. The altitude can also be controlled, as an absolute value, or relative to the ground level, where the altitude value is specified by slider or direct numeric entry. In addition, the heading and tilt of the view can be specified in degrees, selected by slider control or direct numeric entry. The range of the view can also be specified by slider control or by direct numeric entry.

Methods

Figure 8:
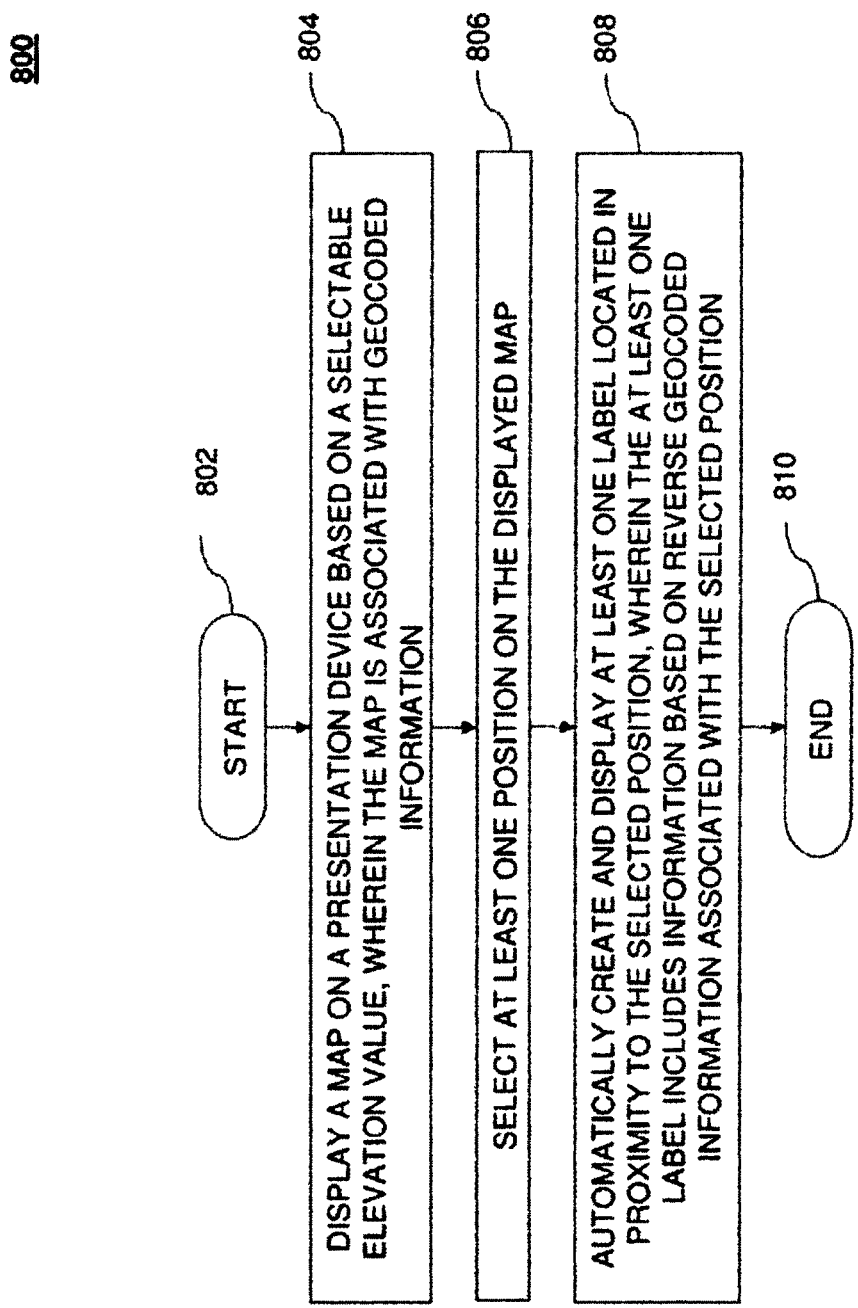
FIG. 8 illustrates a method of creating customizable clickmaps, according to embodiments of the present invention.

FIG. 8 is a flow chart depicting a method 800 of creating a customized clickmap, according to an embodiment of the present invention. The method starts at step 802. In step 804, the method displays a map on a presentation device based on a selectable elevation value, wherein the map is associated with geocoded information. In step 806, the method continues by selecting at least one position on the displayed map. In step 808, the method continues by automatically creating and displaying at least one label located in proximity to the selected position, wherein the at least one label includes information based on reverse geocoded information associated with the selected position. The method concludes with step 810.

Exemplary Computer System

Figure 9:
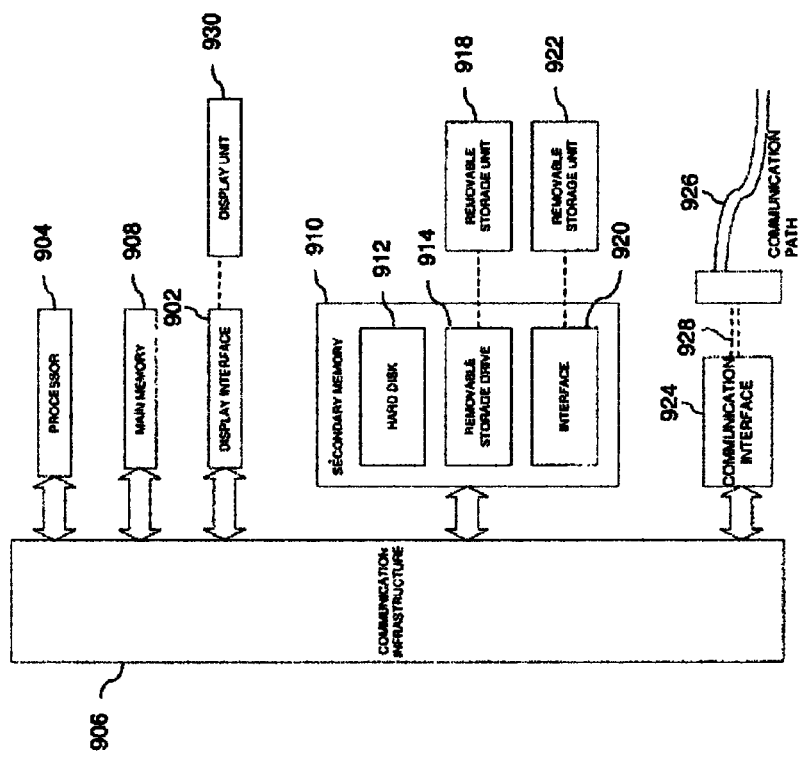
FIG. 9 is an exemplary block diagram of a computer system that can be used to implement embodiments of the present invention.

The various embodiments described herein may be implemented using hardware, software or a combination thereof and may be implemented in a computer system or other processing system. In an embodiment, the invention is directed toward a computer program product executing on a computer system capable of carrying out the functionality described herein. An example of a computer system 900 is shown in FIG. 9. The computer-based systems for providing web content from a server to a target client described above could be implemented in one or more computer systems including, but not limited to, computer system 900. The computer system 900 includes one or more processors, such as processor 904. Processor 904 may be a general purpose processor (such as, a CPU) or a special purpose processor (such as, a GPU). Processor 904 is connected to a communication infrastructure 906 (e.g., a communications bus, cross-over bar, or network). Various software embodiments are described in terms of this example computer system. After reading this description, it will become apparent to a person skilled in the relevant art how to implement the invention using other computer systems and/or computer architectures.

Computer system 900 (optionally) includes a display interface 902 (which can include input/output devices such as keyboards, mice, etc.) that forwards graphics, text, and other data from communication infrastructure 906 (or from a frame buffer not shown) for display on display unit 930.

Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, memory card, etc. which is read by and written to by removable storage drive 914. As will be appreciated, the removable storage unit 918 includes a computer readable storage medium having stored therein computer software and/or data.

In alternative embodiments, secondary memory 910 may include other similar means for allowing computer programs or other instructions to be loaded into computer system 900. Such means may include, for example, a removable storage unit 922 and an interface 920. Examples of such may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communication interface 924. Communication interface 924 enables computer 900 to communicate with external and/or remote devices. For example, communication interface 924 allows software and data to be transferred between computer system 900 and external devices. Communication interface 924 also allows computer 900 to communicate over communication networks, such as LANs, WANs, the Internet, etc. Communication interface 924 may interface with remote sites or networks via wired or wireless connections. Examples of communications interface 924 may include a modem, a network interface (such as an Ethernet card), a communications port, a PCMCIA slot and card, etc. Computer 900 receives data and/or computer program products via communication network 924. Software and data transferred via communications interface 924 are in the form of signals 928 which may be electronic, electromagnetic, and optical or other signals capable of being received by communications interface 924. These signals 928 are provided to communications interface 924 via a communications path (i.e., channel) 926. This channel 926 carries signals 928 and may be implemented using wire or cable, fiber optics, a phone line, a cellular phone link, an RF link and other wired or wireless communications channels.

In this document, the terms "computer program medium" and "computer usable medium" and "computer readable medium" are used to generally refer to media such as removable storage drive 914, and a hard disk installed in hard disk drive 912. These computer program products are means for providing software to computer system 900.

Computer programs (also called computer control logic) are stored in main memory 908 and/or secondary memory 910. Computer programs may also be received via communications interface 924. Such computer programs, when executed, enable the computer system 900 to perform the features of the present invention as discussed herein. In particular, the computer programs, when executed, enable the processor 904 to perform the features of the present invention. Accordingly, such computer programs represent controllers of the computer system 900.

In an embodiment implemented using software, the software may be stored in a computer program product and loaded into computer system 900 using removable storage drive 914, hard disk drive 912 or communications interface 924. The control logic (software), when executed by the processor 904, causes the processor 904 to perform the functions of the invention as described herein.

Embodiments of the invention can work with software, hardware, and operating system implementations other than those described herein. Any software, hardware, and operating system implementations suitable for performing the functions described herein can be used.

CONCLUSION

While specific embodiments of the invention have been described above, it will be appreciated that the invention may be practiced otherwise than as described. For example, the invention may take the form of a computer program containing one or more sequences of machine-readable instructions describing a method as disclosed above, or a data storage medium (e.g., semiconductor memory, magnetic or optical disk) having such a computer program stored therein.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation and without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The Summary and Abstract sections may set forth one or more but not all exemplary embodiments of the present invention as contemplated by the inventors, and thus, are not intended to limit the present invention and the appended claims in any way.

What is claimed is:

1. A system for creating customized labeled maps, comprising:
   a presentation device;
   a mapping system configured to access map data and use the map data to display a map using the presentation device based on a selectable elevation value; and
   a clickmap system configured to automatically create and display at least one label located in proximity to a user selected position on the map based on a selected height above the user selected position,
   wherein the map data includes geocoded information,
   wherein the at least one label is based on reverse geocoded information associated with the user selected position, and
   wherein content included within the at least one label is automatically selected based on the elevation value of the map view when the user selected position is selected by a user,
   wherein the selected content is not varied with changes in the elevation value of the map view.

2. The system of claim 1, wherein the at least one label is displayed as at least one of:

a fixed image overlay;
a placemark;
an animation;
three-dimensional text; or
a billboard.

3. The system of claim 2, wherein the placemark includes an image.

4. The system of claim 1, wherein the selected height is associated with an elevation level above the ground that determines where the label appears in relation to a ground level of the map.

5. The system of claim 1, wherein the selected height above the user selected position is independent of the selectable elevation value of the map.

6. The system of claim 1, wherein a specificity level of the content selected for inclusion within the at least one label decreases as the elevation value is increased.

7. The system of claim 1, wherein label content and position are editable.

8. The system of claim 1, further comprising a timeline configured to create a sequence in time including a plurality of maps and labels.

9. The system of claim 1, wherein the visibility of the at least one label is dependent on the elevation value of the map being displayed.

10. The system of claim 1, wherein the displayed map is based upon a user input location identifier.

11. The system of claim 1, wherein the clickmap system further comprises:
    a control panel that enables a user to select a creation and display option associated with the at least one label including at least one or more of:
    a label style option;
    a text option;
    an image option;
    a visibility option;
    a balloon option; or
    a view option.

12. A method for creating customized labeled maps, comprising:
    displaying, by one or more computing devices, a map using a presentation device based on a selectable elevation value, wherein the map is associated with geocoded information, wherein each of the one or more computing devices comprises one or more processors;
    selecting, by the one or more computing devices, at least one position on the displayed map; and
    creating and providing for display, by the one or more computing devices, at least one label located in proximity to the selected position based on a selected height above the user selected position, wherein the at least one label includes information based on reverse geocoded information associated with the selected position, wherein content included within the at least one label is automatically selected based on the elevation value of the map view when the user selected position is selected by a user and wherein the selected content is not varied with changes in the elevation value of the map view.

13. The method of claim 12, wherein the at least one label is displayed as at least one of:
    a fixed image overlay;
    a placemark;
    an animation;
    three-dimensional text; or
    a billboard.

14. The method of claim 13, wherein the placemark includes an image.

15. The method of claim 12, wherein the selected height is associated with an elevation level above the ground that determines where the label appears in relation to a ground level of the map.

16. The method of claim 12, wherein the selected height above the user selected position is independent of the selectable elevation value of the map.

17. The method of claim 12, wherein a specificity level of the content selected for inclusion within the at least one label decreases as the elevation value is increased.

18. The method of claim 12, wherein label content and position are editable.

19. The method of claim 12, further comprising creating a sequence in time including a plurality of maps and labels.

20. The method of claim 12, wherein the visibility of the at least one label is dependent on the elevation value of the map being displayed.

21. The method of claim 12, wherein display of a label is dependent on the visibility of an underlying feature.

22. The method of claim 12, wherein the automatically creating and displaying at least one label further comprises:
    a step of displaying a control panel that enables a user to select a creation and display option associated with the at least one label including at least one or more of:
    a label style option;
    a text option;
    an image option;
    a visibility option;
    a balloon option; or
    a view option.

* * * * *